US006766069B1

(12) United States Patent
Dance et al.

(10) Patent No.: US 6,766,069 B1
(45) Date of Patent: Jul. 20, 2004

(54) TEXT SELECTION FROM IMAGES OF DOCUMENTS USING AUTO-COMPLETION

(75) Inventors: Christopher R. Dance, Cambridge (GB); William M. Newman, Cambridge (GB); Alex S. Taylor, Ascot (GB); Stuart A. Taylor, Cambridge (GB)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/469,958

(22) Filed: Dec. 21, 1999

(51) Int. Cl.[7] ................................................. G06K 9/03

(52) U.S. Cl. ........................ 382/309; 704/251; 358/406; 382/229; 382/231; 382/311

(58) Field of Search ................................ 382/203, 177, 382/229, 181, 224, 173, 175, 309, 187, 310, 188, 311, 189, 305, 306, 231; 707/3, 6, 512, 513, 2; 704/8, 9, 251, 270; 358/1.6, 406

(56) References Cited

U.S. PATENT DOCUMENTS

| 4,468,694 A | * | 8/1984 | Edgar .......................... 348/135 |
| 4,667,248 A | * | 5/1987 | Kanno .......................... 358/452 |
| 5,201,011 A | * | 4/1993 | Bloomberg et al. .......... 382/175 |
| 5,511,148 A | * | 4/1996 | Wellner ........................ 358/1.6 |
| 5,832,474 A | * | 11/1998 | Lopresti et al. ................ 707/2 |
| 5,926,565 A | * | 7/1999 | Froessl ......................... 382/181 |

FOREIGN PATENT DOCUMENTS

EP    0 881 592 A2    12/1998

OTHER PUBLICATIONS

Borland, Russell Word "AutoComplete" feature, described in "Running Microsoft Word 97," Microsoft Corporation, 1997, pp. 27–28 and pp. 154–156.
"Customizing Dynamic Abbreviation," (one page, with ten page Table of Contents) from the GNU Emacs Manual, Nov. 6, 1998, available on the Internet at http://www.gnu.org/manual/emacs–20.3/html_note/emacs_toc.html.
Dodge, Mark et al. Excel "AutoComplete" feature, described in "Running Microsoft Excel 97," Microsoft Corporation, 1997, pp. 316–318.
Stevens, Jacob et al. "Automatic Processing of Document Anotations," British Machine Vision Conference 1998, pp. 438–448.

* cited by examiner

Primary Examiner—Bhavesh M. Mehta
Assistant Examiner—Seyed Azarian

(57) ABSTRACT

A user-interface for selecting text from images of documents using auto-completion is described. The auto-completion process may be used to complete words (or text sequences), phrases, sentences, paragraphs, or other groupings of words. In response to user input, the OCR results for one or more images of documents are searched. The user input may include typing in a partial word (or the initial characters in a text sequence) via an input device or alternatively, annotations made by a user on a hardcopy document prior to scanning the document. One or more word matches are presented to the user for acceptance until the user accepts a word match or until all word matches have been presented to the user. Once a user accepts a word match, the word match is copied into an electronic document such as a word processing document, spreadsheet document, or other electronic document created by an application program. The auto-completion process may be repeated until the selected text region is copied into the electronic document.

21 Claims, 21 Drawing Sheets

FIG. 1 derivative of the present invention will
e time as the Walden inversion, and N-a
bjected to an aldol reaction with pyruvic
ever the inversion took place during the derivative of the present invention will
e time as the Walden inversion, and N-a
bjected to an aldol reaction with pyruvic
ever the inversion took place during the

FIG. 14 derivative of the present invention will
e time as the Walden inversion, and N-a
bjected to an aldol reaction with pyruvic
ever the inversion took place during the

FIG. 15 derivative of the present invention will
e time as the Walden inversion, and N-a
bjected to an aldol reaction with pyruvic
ever the inversion took place during the

FIG. 16 derivative of the present invention will
e time as the Walden inversion, and N-a
bjected to an aldol reaction with pyruvic
ever the inversion took place during the

TEXT SELECTION FROM IMAGES OF DOCUMENTS USING AUTO-COMPLETION

BACKGROUND

1. Field of the Invention

The present invention relates to user interfaces for document scanning, and more specifically to selecting text regions from an image scanned.

2. Description of Related Art

As technological advances in digital photography continue to increase the performance of digital cameras while reducing their cost, digital cameras may become widely used as document scanners in general office environments. For example, images from a hardcopy document may be captured by a camera positioned over a desktop and digitized for further processing and display on a computer monitor. This type of scanning promotes a "scan-as-you-read" interface between paper and electronic media and is often referred to as "over-the-desk" scanning. An example of such an over-the-desk scanning system is disclosed by Wellner in U.S. Pat. No. 5,511,148 entitled "Interactive Copying System."

One advantage of over-the-desk scanning versus traditional contact scanning is that of convenience because it is not necessary to remove hardcopy documents from their usual place of reading. This encourages a more casual type of scanning where a user is able to scan a small amount of information from a document as it is encountered while reading.

For example, a short text sequence (e.g., 5–10 words) can be recorded by a camera and then converted into coded text by applying optical character recognition (OCR). The OCRed version of the selected text may then be copied into an electronic document where it can be manipulated by a text editing or word processing application on a computer system. This type of scanning saves the user from having to retype the selected text into a computer system.

One approach to scanning selected text regions of a camera image is to select a region by using a mouse to define two points via a "click-and-drag" operation. Another approach is to click on a start point and click on the end point. Once the text region is selected by the user, it can then be copied into the system clipboard (or other memory resource maintained by the operating system) and then subsequently copied into an electronic document (also referred to as a target document). The target document may be an electronic document created from a spreadsheet application, word processing application, presentation application, or other application program.

Scanning short text sequences with a camera offers a viable solution to a user only if the short text sequence can be selected and copied at a faster speed than the amount of time it would take a user to retype such a text sequence. The speed at which a selected text region is copied into a target document can be improved by minimizing the amount of time it takes a user to select a text region.

SUMMARY OF THE INVENTION

A system, method and program for selecting text from one or more images of at least one document using auto-completion according to one embodiment of the present invention is described. In response to user input of a partial word, optical character recognition (OCR) results for one or more images of at least one document are searched for word matches. The user is presented with a word match for acceptance. If the user accepts the word match, the word match is copied into an electronic document. If the user does not accept the word match, another word match is presented until all word matches have been presented or until the user accepts a word match.

A system, method and program for selecting text from an image of a document using auto-completion while providing user feedback according to another embodiment of the present invention is described. In response to user input of a partial word, OCR results of an image of a document is searched for word matches. The image with all word matches highlighted with emphasis is displayed. The displayed image also-highlights one of the word matches with additional emphasis to indicate it is being offered to the user for acceptance. If the user accepts the offered word match, feedback is provided to the user indicating that the offered word match represents a word selected for copying into an electronic document.

A system, method and program for selecting text from an image of a document having user annotations according to an alternative embodiment of the present invention is described. An image of an annotated document is retrieved. A selected region is identified based on the user annotations. The OCR results of the image of the annotated document is searched for a match of the selected text region. The selected text region is copied into an electronic document.

A system, method and program for selecting a text region from a document, which includes a table with a plurality of cells according to a further embodiment of the present invention is described. In response to user input of a character string, OCR results of an image of the table is searched for cell matches. The cell match is displayed and copied into an electronic document.

Other features of the present invention will be apparent from the accompanying drawings and from the detailed description which follows.

BRIEF DESCRIPTION OF THE DRAWINGS

These and other aspects of the invention will become apparent from the following description read in conjunction with the accompanying drawings wherein the same reference numerals have been applied to like parts and in which:

FIG. 1 illustrates an example of a text region selected for copying;

FIG. 14 illustrates video feedback of the word matches from the camera images shown in FIG. 6 when "inv" is typed by the user;

FIG. 15 illustrates video feedback of the word matches from the camera image shown in FIG. 6 after the user has rejected the first two completions offered;

FIG. 16 illustrates video feedback of the word matches from the camera image shown in FIG. 6 after the user has accepted the third completion offered;

FIG. 17 illustrates video feedback of the word matches from the camera image shown in FIG. 6 after the user has accepted the three words following the third completion;

FIG. 19 illustrates an example of an annotated document;

DETAILED DESCRIPTION

Image capture devices such as digital cameras can be used to capture images of hardcopy documents as they lie face up on the reader's desk. This creates a very natural and efficient interface for copying portions of a hardcopy document into an electronic document. This type of scanning saves a user from having to retype text from a hardcopy document when incorporating the text in an electronic document.

A critical performance parameter in copying a sequence of words (e.g., 4 to 6 words) from an image of a hardcopy document into an electronic document is the amount of time it takes for a user to select a sequence of words and copy it into an electronic document. An auto-completion process may be used to reduce the amount of time it takes a user to select a sequence of words.

Auto-completion refers to the process of automatically completing one or more words without manually typing all the text. The completed word(s) are selected for copying into an electronic document. In this context, a word may represent a word in various languages, a numeric value, or some other text representation. For various embodiments of the present invention, once a user types the initial characters of a word, he/she can initiate (or invoke) auto-completion by stroking a designated key or combination of designated keys. For alternative embodiments, the suggestion of word matches may not require the user to press a key. For example, high confidence completions can be automatically selected.

Figure 1:
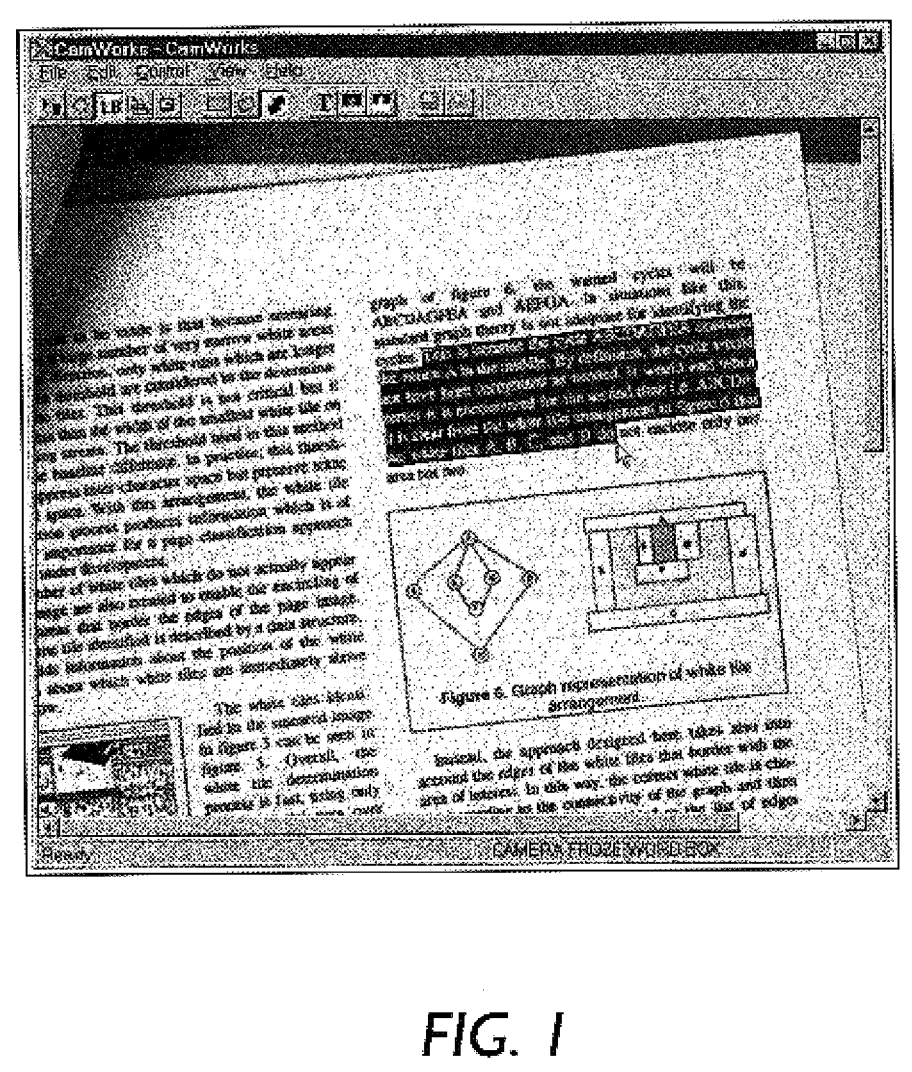
Figure 2:
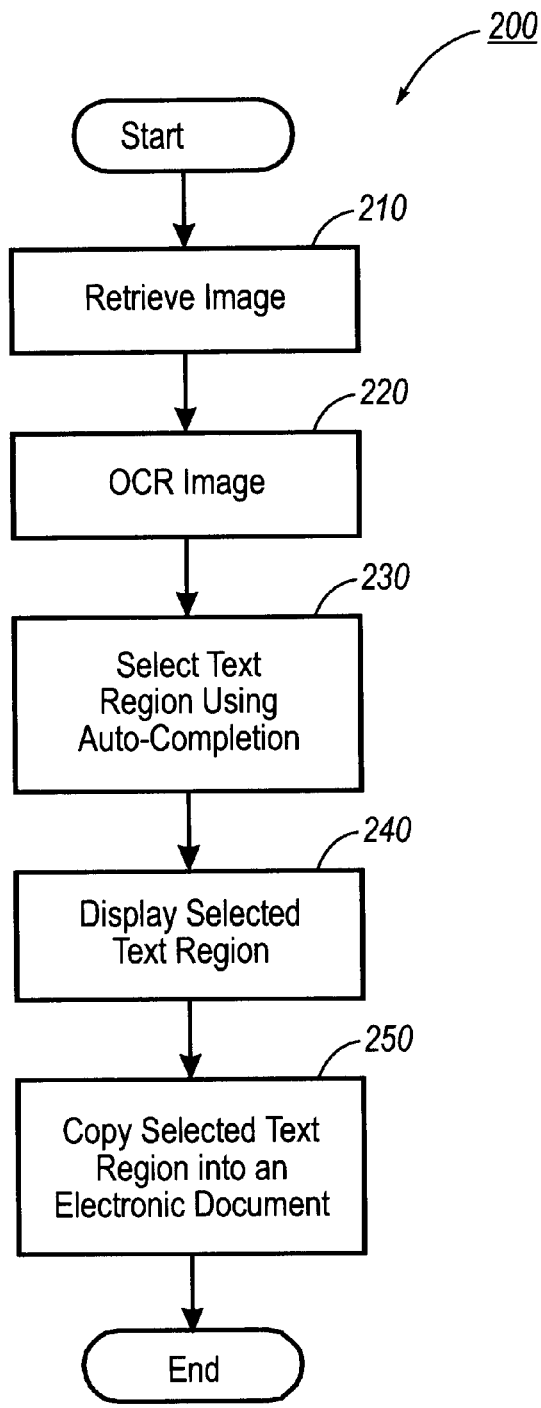
FIG. 2 illustrates a logic flow diagram for copying a selected text region using auto-completion in accordance with one embodiment of the present invention.

FIG. 2 illustrates a logic flow diagram 200 for copying a selected text region using an auto-completion process in accordance with one embodiment of the present invention. An image of a hardcopy document is retrieved in box 210. The image may be an image captured by an image capture device or an image of a previously scanned document, which was stored as a file. The image may represent a page (or a portion of a page) or multiple-pages (or portions of multiple pages) of document(s). FIG. 1 illustrates an image representing a portion of a page from a hardcopy document.

For one embodiment of the invention, the image capture device is a digital video camera. The video stream may be frozen to capture an image by having the user select a "freeze" button or a "selection-mode" button, upon designating a starting point (or other point) of a selected text region by a user, or other methods known to stop the motion of a video stream of a camera. For an alternative embodiment of the present invention, the image capture device may be a digital still image camera.

In box 220, optical character recognition (OCR) is performed to convert image data (e.g. binary or multiple-bit-pixel data such as greyscale or color) into coded text. The OCR results for the image may be stored in a memory buffer or other memory device.

In box 230, the user may select a sequence of words for copying into a target document by using various auto-completion techniques. Various embodiments of these techniques will be described below. The selected text sequence is displayed to the user in box 240 and copied into an electronic document in box 250. For one embodiment of the present invention, the electronic document may be a document created with a word processing program, a spreadsheet program, or other electronic document/authoring tool.

Figure 3:
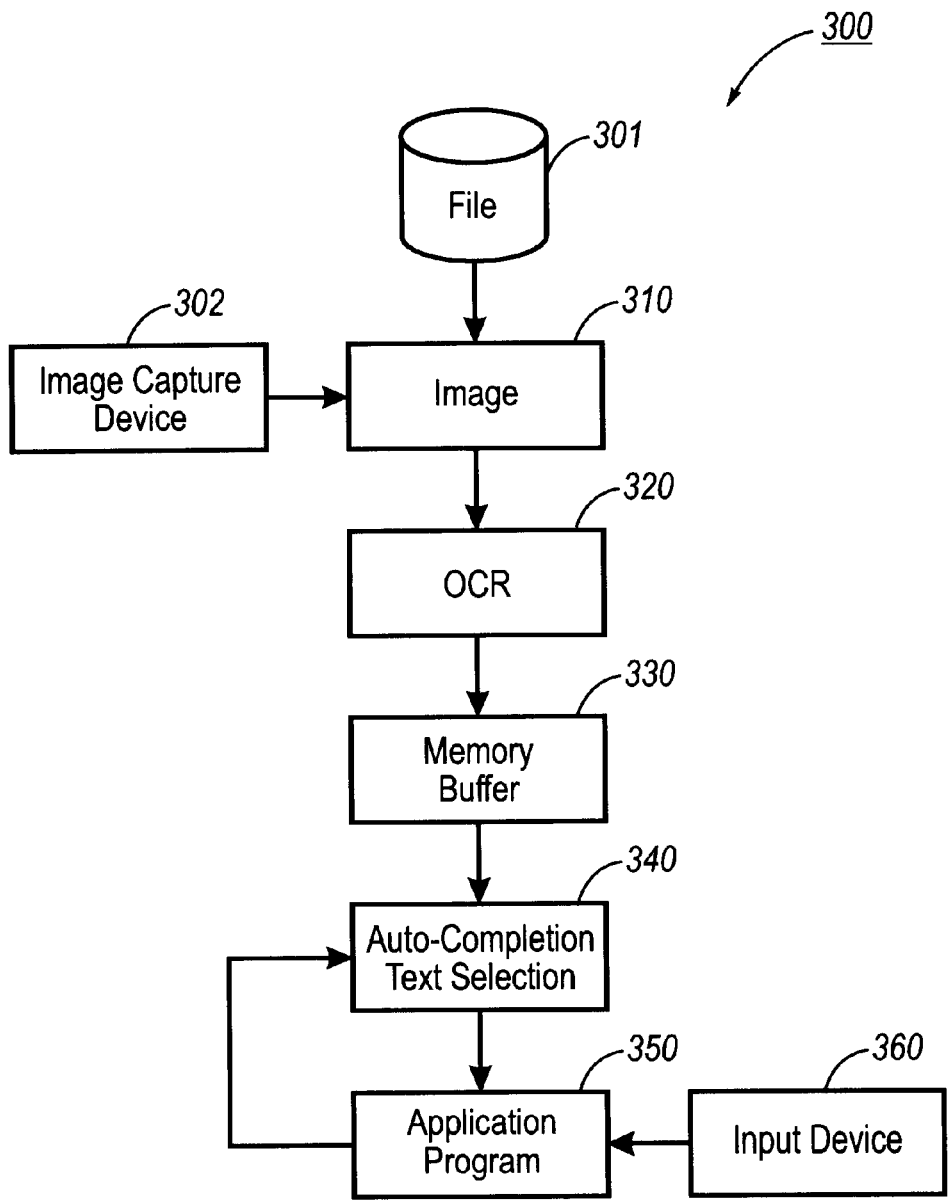
FIG. 3 illustrates an auto-completion system for selecting a text region using auto-completion according to one embodiment of the present invention.

FIG. 3 illustrates an Auto-Completion System 300 for implementing logic flow diagram 200 according to one embodiment of the present invention. An OCR Unit 320 performs OCR on an Image 310. The Image 310 may represent an image of a previously scanned document stored as a File 301, or alternatively, Image 310 may represent a hardcopy document that is presently under Image Capture Device 302 such as a camera or other scanning or image capture device. The OCR results produced by OCR Unit 320 are stored in a Memory Buffer 330. Alternatively, OCR results may be stored in a file which is subsequently loaded into Memory Buffer 330.

When a user decides to copy a sequence of words from a source document into an electronic document he/she is creating (also referred to as a target document) in a particular Application Program 350, he/she types the initial characters of the first word in the word sequence in the target document and invokes an auto-completion process. Input device 360 may represents a keyboard and mouse combination. In response to the user input, Application Program 350 provides feedback to an Auto-Completion Text Selection Unit 340 to search the OCR results for word matches. In general, a word match is made if the coded text for a word includes the characters typed by the user.

Figure 4:
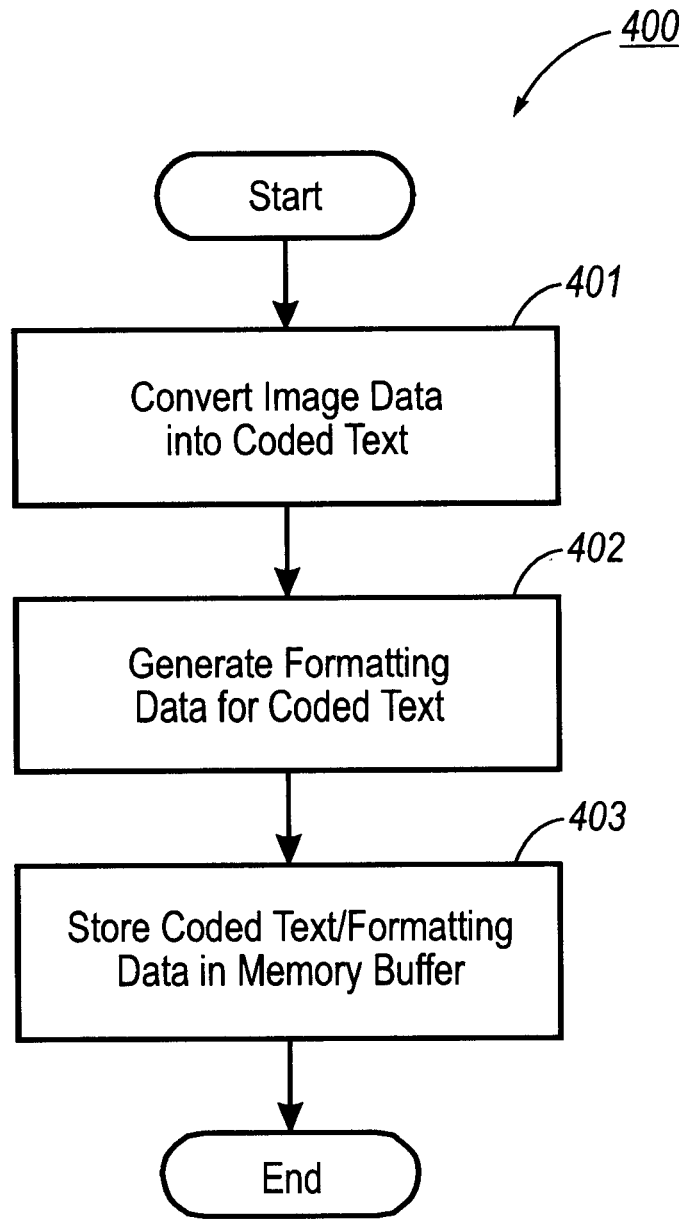
FIG. 4 illustrates a logic flow diagram for performing the relevant portions of OCR in accordance with one embodiment of the present invention.

FIG. 4 illustrates a logic flow diagram 400 for performing the relevant portions of OCR in accordance with one embodiment of the present invention. The OCR results often include document segmentation data (e.g., information relating to the identification of various text, image (picture) and line segment portions of an image), text information such as coded text, and formatting data (e.g., word bounding boxes, text lines, and text regions). In box 401, image data is converted into coded text such as ASCII text. In box 402, formatting data is generated for the coded text. For alternative embodiments of the present invention, the formatting data may be generated prior to converting the image data into coded text. In box 403, the coded text and formatting data is stored in a memory buffer. The OCR results stored in the memory buffer are searched to find word matches when the user types the initial characters of a word.

Figure 5:
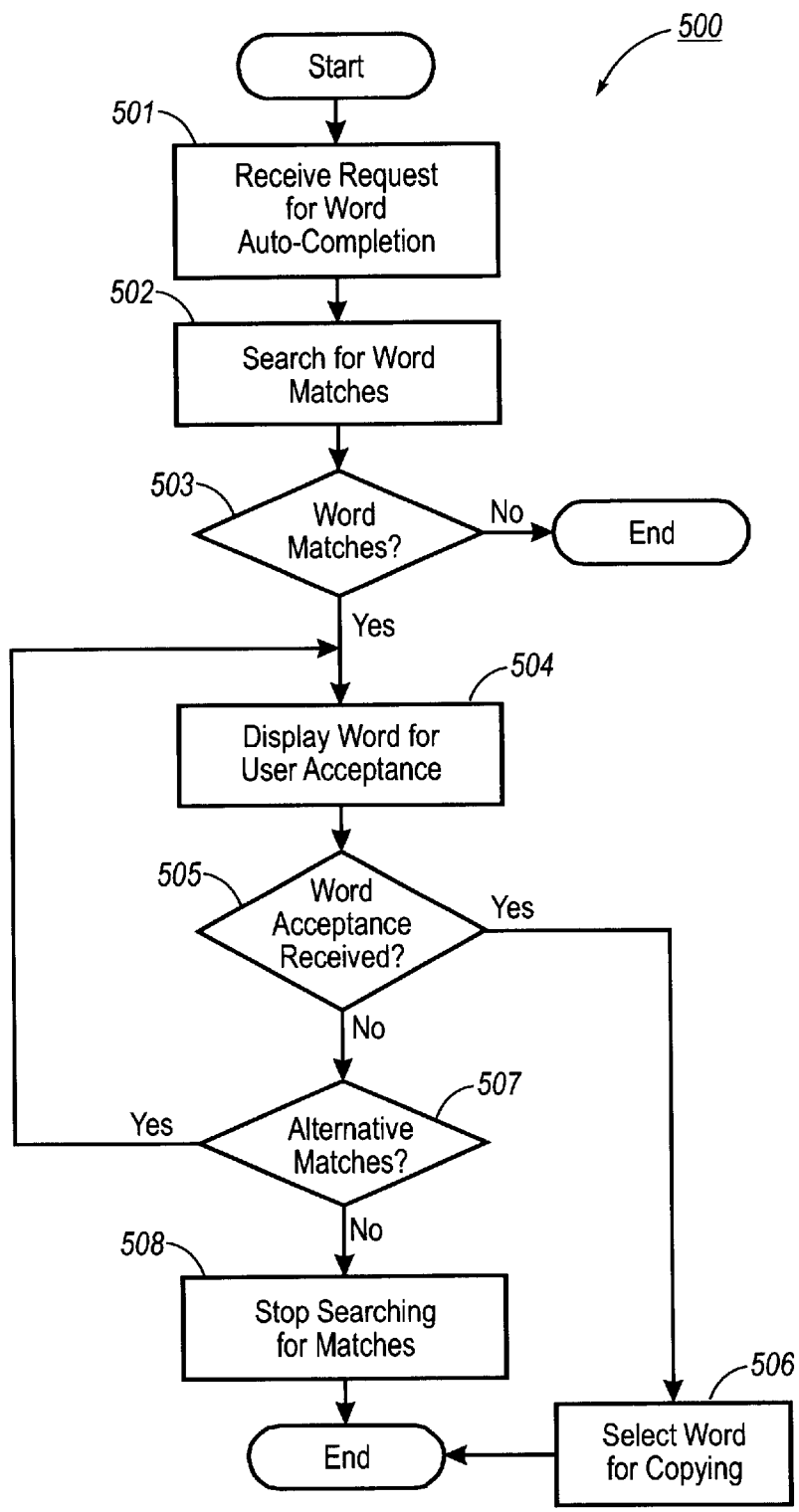
FIG. 5 illustrates a logic flow diagram for selecting one or more words using auto-completion according to one embodiment of the present invention.

FIG. 5 illustrates a logic flow diagram 500 for selecting words using the auto-completion system shown in FIG. 3. In box 501, a request for word auto-completion is received. For one embodiment of the present invention, a user will type in the initial characters of a word (e.g., the first two, three, four, etc. characters of a word). The user may invoke an auto-completion process by selecting a request key such as a right arrow key on a keyboard. For alternative embodiments, the system may automatically invoke auto-completion.

Once the auto-completion process is invoked, the string of characters typed by the user is compared to the OCR results stored in a memory buffer as shown in box 502. For one embodiment of the present invention, the OCR results represent the OCR results for a single document, and for alternative embodiments, the OCR results represent the OCR results for multiple documents.

When a suitable match is found as shown in decision box 503, the word match, which contains the same (or similar) initial characters typed by the user is displayed for user acceptance as shown in box 504. In a preferred embodiment, the suggested completion is displayed in a fashion that is distinct from the text that the user has typed. For example, if the user's text is shown in black, the completion will be shown in grey.

If a user accepts the word match offered in decision box 505, then that word is selected for copying into a target document as shown in box 506. For one embodiment of the present invention, the user accepts the completion by continuing to type text into the target document. Once the word auto-completion process is completed the user may continue typing into the target document or may repeat this word auto-completion process.

If a user rejects the word match offered in decision box 505, then a determination is made whether there are any alternative matches. For one embodiment of the present invention, the "up arrow" key is used both to reject the present completion and to request an alternative completion. If an alternative match is found in decision box 507, then the alternative word match is displayed for user acceptance in box 504. Boxes 504, 505, and 507 operate are repeated as long as the user keeps rejecting the offered word match.

Once no alternative word matches are available in decision box 507, then searching for word matches is stopped by the user. The user may stop the system from cycling through the already rejected word matches by selecting an "END" key, or deleting the most recently offered word match.

Figure 6:
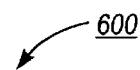
FIG. 6 illustrates a camera image of a portion of a source document.

FIG. 6 illustrates an image 600 of a portion of a document. The image 600 may represent an image of a document being captured by an image capture device or may represent an image of a previously scanned document, which was saved as a file. FIGS. 7 through 10 provide an example of the auto-completion process performed on image 600 in accordance with logic flow diagram 500.

Figure 7:
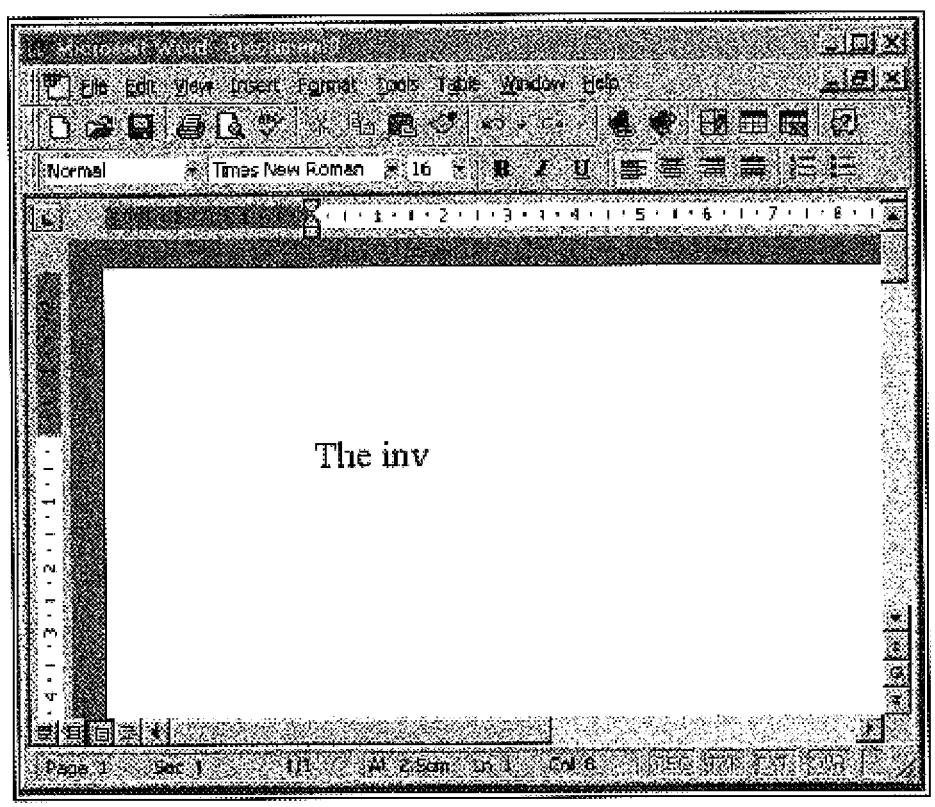
FIG. 7 illustrates text typed by a user in a document created with a word processing program when selecting a text region from the source document of FIG. 6.

FIG. 7 illustrates an example of initial characters of a word "inv" typed by a user into a MICROSOFT® Word document. Once the user invokes the auto-completion process, the system searches for word matches by comparing these three letters to the OCR results stored in the memory buffer. When the auto-completion system identifies a word match, that word match is displayed for user acceptance.

Figure 8:
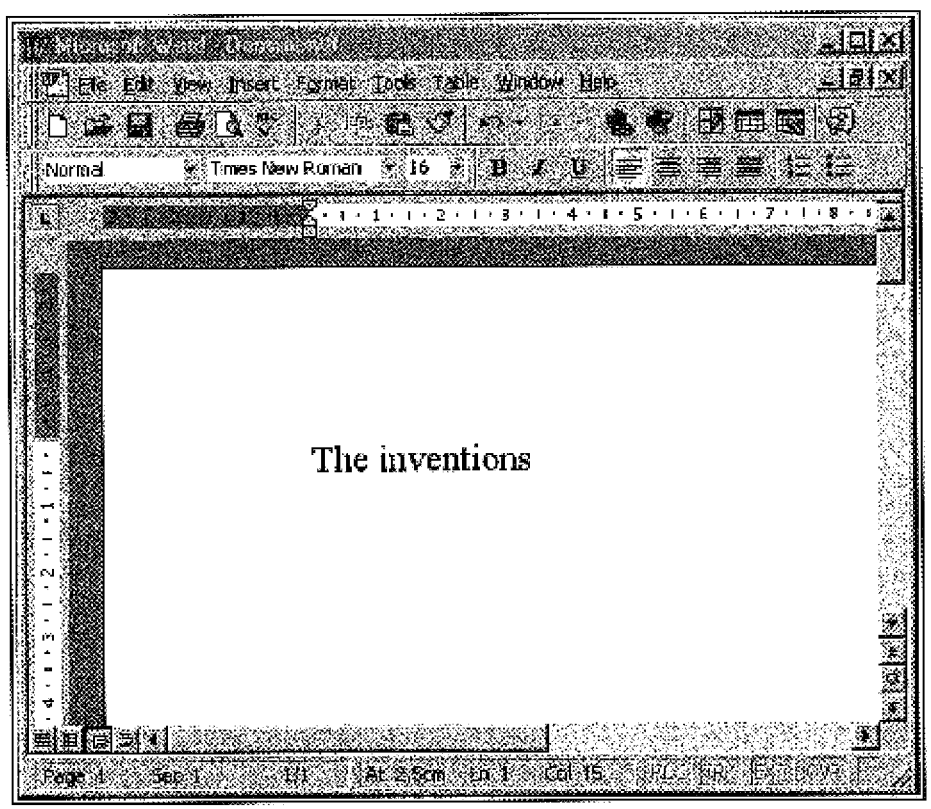
FIG. 8 illustrates an example of a first auto-completed word offered to a user from the source document of FIG. 6.

FIG. 8 illustrates a first auto-completed word offered to the user. The first word match displayed is the word "inventions". In this example, the user rejects the word "inventions" and the auto-completion system searches for alternative matches.

Figure 9:
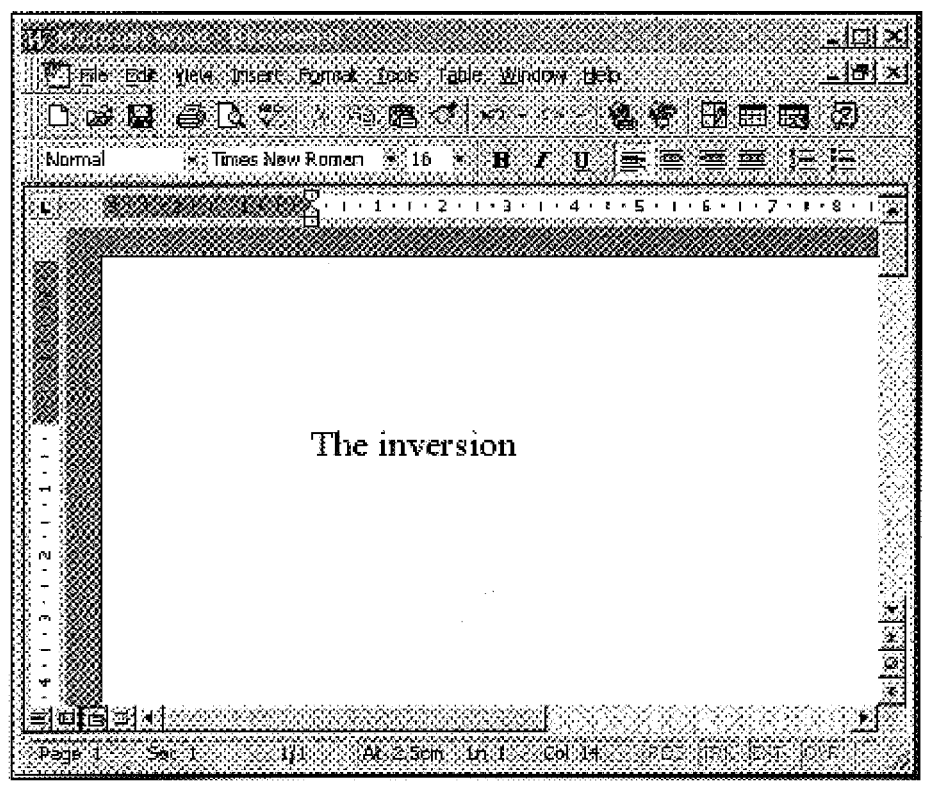
FIG. 9 illustrates a second auto-completed word offered to a user from the source document of FIG. 6.

FIG. 9 illustrates a second auto-completed word offered to the user. The auto-completion system finds an alternative word match "inversion" and displays the word "inversion" for user acceptance. In this example, the user accepts the offered word match "inversion". Acceptance of the offered word match copies the word "inversion" into the MICROSOFT® Word document.

Figure 10:
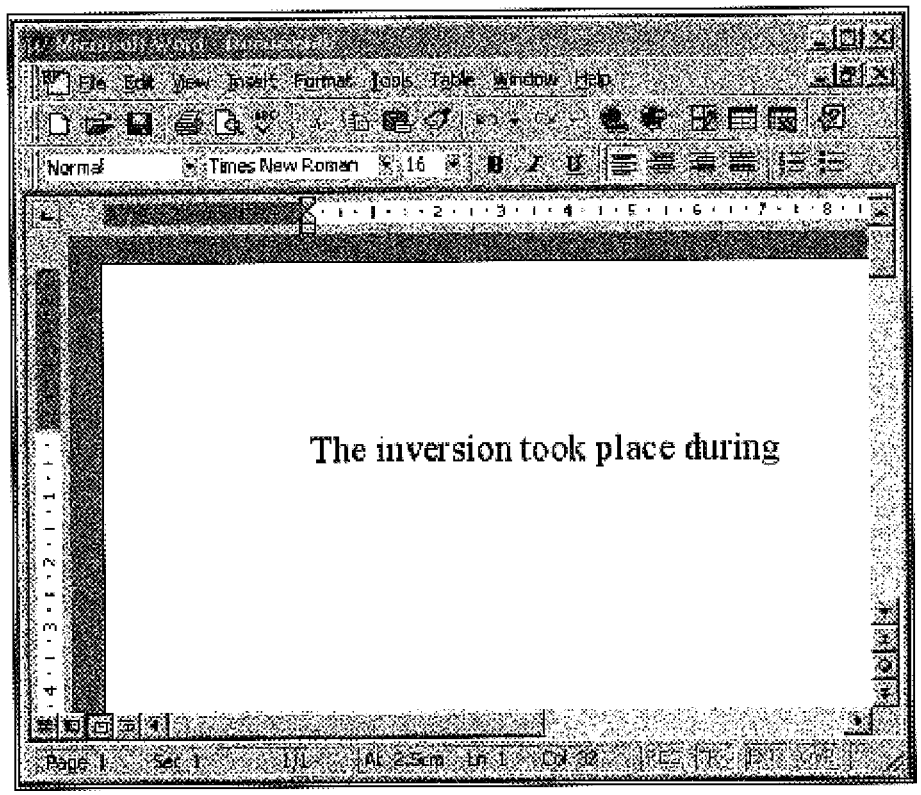
FIG. 10 illustrates multiple auto-completed words selected by a user from the source document of FIG. 6.

If the word "inversion" is not the last word in the word sequence that the user desires to copy into the his/her target document, the user may request additional words from the source phrase containing the first word accepted, or may type in the additional words or a combination of both, as illustrated in FIG. 10.

Figure 11:
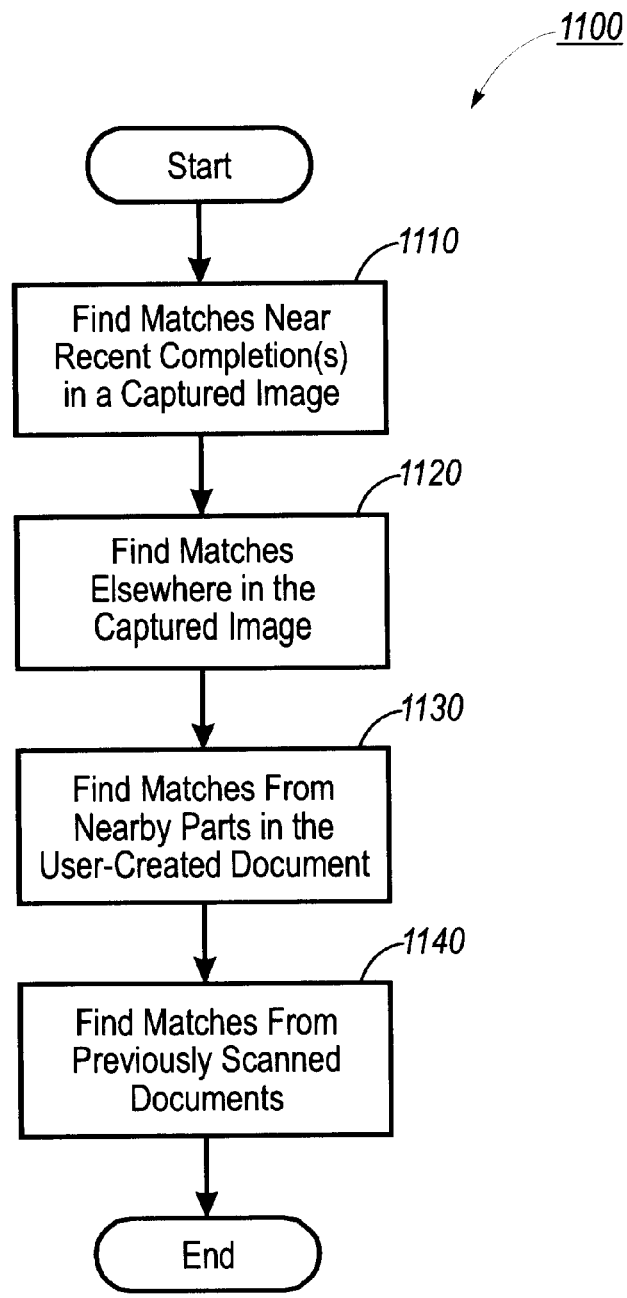
FIG. 11 illustrates a logic flow diagram for selecting one or more words from multiple document images according to one embodiment of the present invention.

FIG. 11 illustrates a logic flow diagram 1100 for selecting one or more words from multiple documents according to one embodiment of the present invention. For one embodiment of the present invention, the source documents may represent the document having its image captured by the image capture device or documents previously scanned and stored as a file.

In box, 1110 and 1120, the document having its image captured by an image capture device is searched for matches. Matches near the recent completion(s) are first located and then matches elsewhere in the document located.

In box 1130, the user-created document is searched for matches. The user-created document refers to the target document. The user-created document may be a word-processing document, spreadsheet document, or other type of document created in an application program. Thus, words that have already been typed or auto-completed in the target document can be used for future auto-completions in the target document.

There are various ways to choose which part of the target document to complete from. In one embodiment of the present invention, completions are suggested in the order in which they occur in the file, starting from the beginning of the file. For alternative embodiments of the present invention, completions may be suggested starting from the place most recently completed from. In yet other embodiments of the present invention, the linguistic context of the current cursor position is used to find a best matching completion.

In box 1140, previously scanned documents are searched. For one embodiment of the present invention, the previously scanned documents are searched in reverse chronological order. In other words, the most recently scanned document is searched first while the earliest scanned document is searched last.

For an alternative embodiment of the present invention, previously scanned documents are searched according to a priority list. The following examples illustrate how previously scanned documents may be prioritized. When a user scans a new document image that document moves to the top of the priority list. When a user completes from a document or document image, that document moves to the top of the priority list. When a user browses through previously scanned images and requests a completion while looking at one particular image, that image moves to the top of the priority list.

Figure 12:
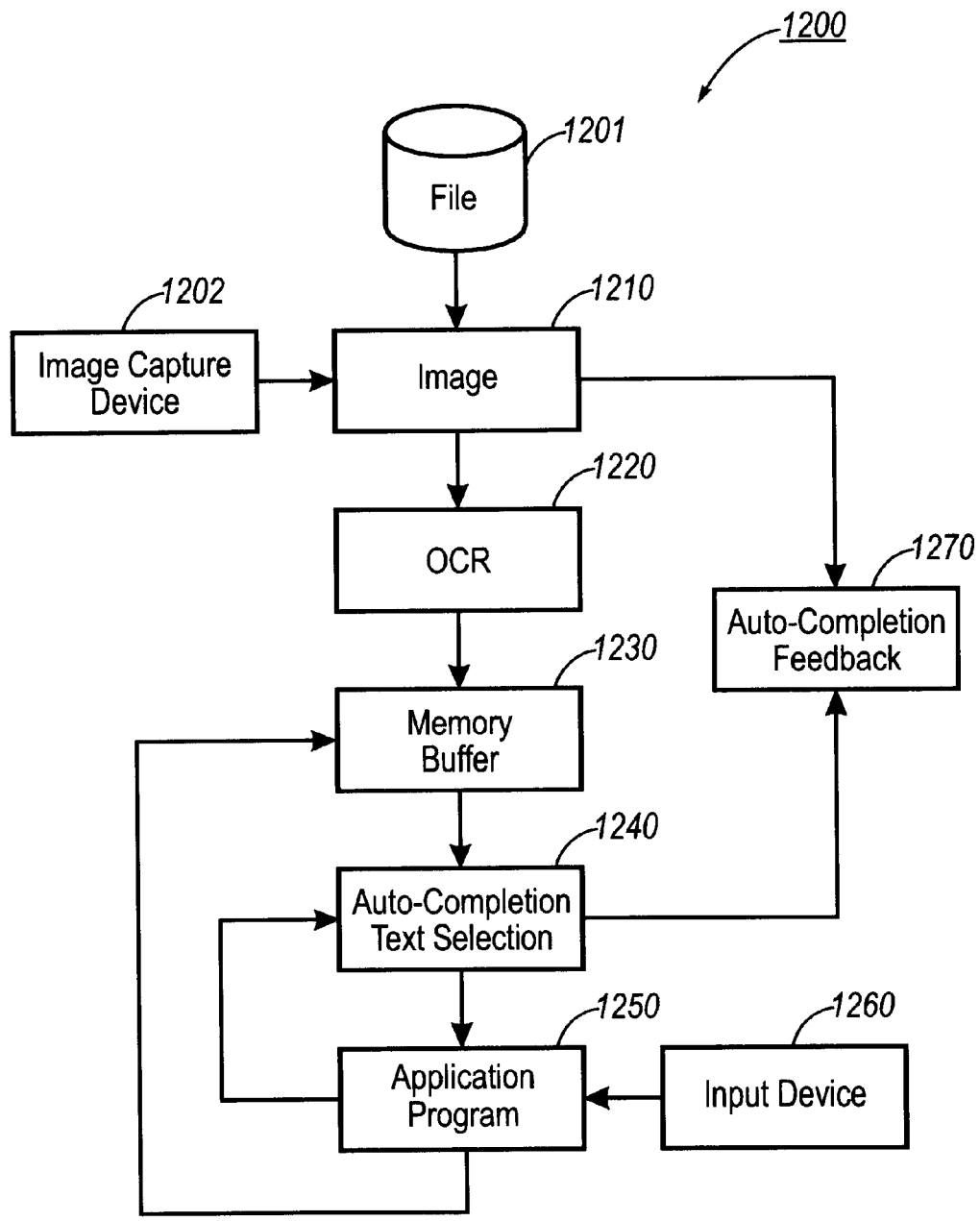
FIG. 12 illustrates an auto-completion system for selecting a text region with video feedback according to one embodiment of the present invention.

FIG. 12 illustrates an Auto-Completion System 1200 for implementing logic flow diagram 200. An OCR Unit 1220 performs OCR on an Image 1210 of a hardcopy document. The Image 1210 may represent a previously scanned document stored as a File 1201 or a hardcopy document presently within the field of view of an Image Capture Device 1202 such as a camera. The OCR results produced by OCR Unit 1220 are stored in a Memory Buffer 1230. Alternatively, OCR results may be stored in a file which is subsequently loaded into Memory Buffer 1230.

When a user decides to copy a sequence of words from a source document into an electronic document he/she is creating (also referred to as a target document) in a particular Application Program 1250, he/she types the initial characters of the first word in the word sequence in the target document and invokes an auto-completion process. Input device 1260 may represent a keyboard and mouse combination. In response the user input, Application Program 1250 provides feedback to an Auto-Completion Text Selection Unit 1240. The Auto-Completion Text Selection Unit 1240 compares the string of characters inputted by the user to the coded text generated during OCR to locate any word matches. An Auto-Completion Feedback Unit 1270 displays the image of the document along with the word matches.

Figure 13:
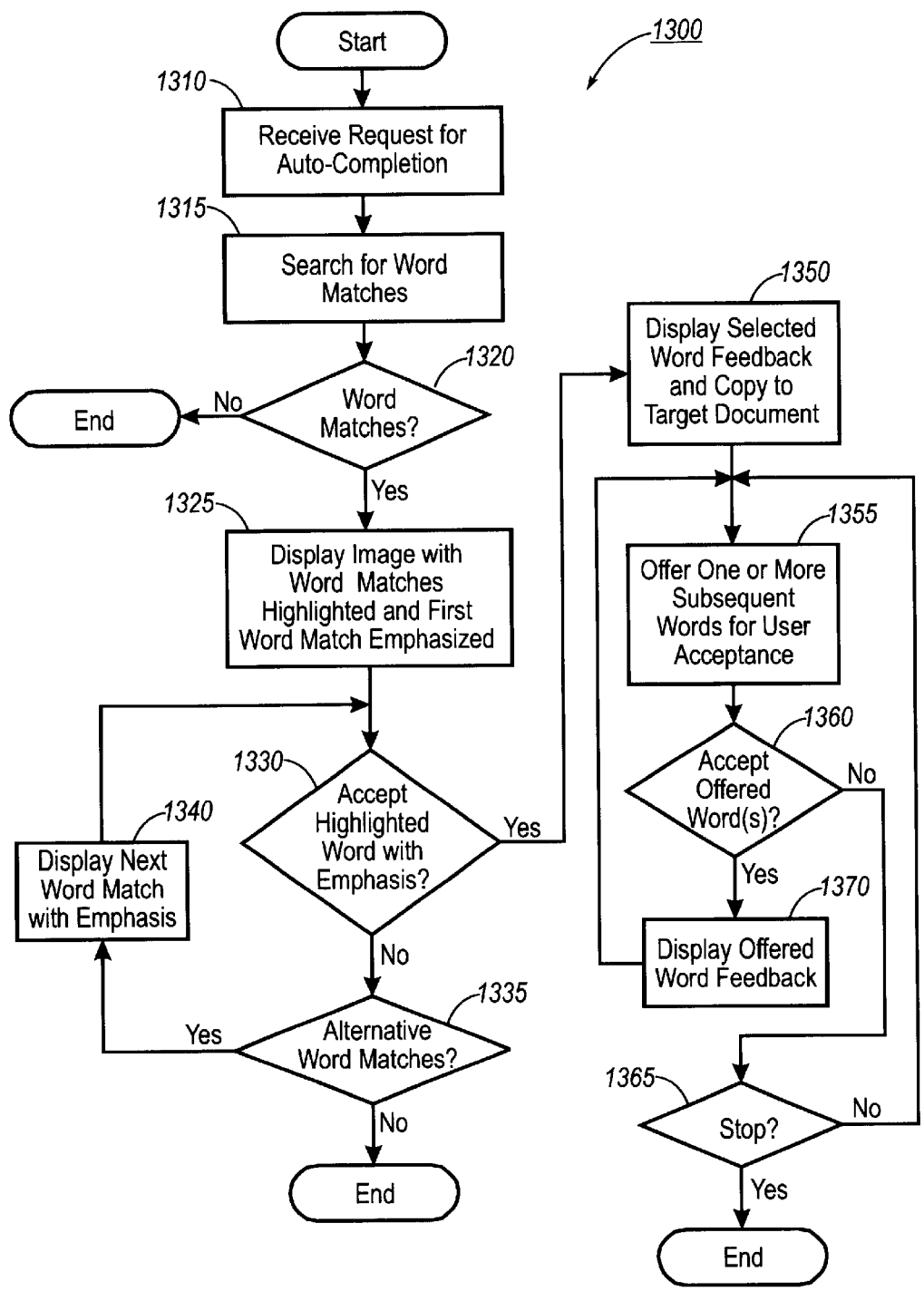
FIG. 13 illustrates a logic flow diagram for selecting one or more words using auto-completion with video feedback of the word matches according to one embodiment of the present invention.

FIG. 13 illustrates a logic flow diagram 1300 for selecting one or more words using the auto-completion system shown in FIG. 12. In box 1310 a request for auto-completion is received. For one embodiment of the present invention, a user will type in the initial characters of a word (e.g., the first two, three, four, etc. characters of a word). The user may then invoke an auto-completion process by selecting a request key. For alternative embodiments, the system may automatically invoke auto-completion.

Once the auto-completion process is invoked by the user, the OCR results are searched for word matches as shown by box 1315. The OCR results may represent the results from one or more images of documents.

Once suitable word matches are identified in decision box 1320, the image is displayed with the word matches highlighted as shown in box 1325. Furthermore, the first word match is displayed with additional emphasis. The first word match is displayed with additional emphasis (e.g., highlighted) to indicate that it is being offered for user acceptance. For one embodiment of the present invention, only one word match is offered for user acceptance at a time.

If the offered word match is accepted by the user in decision box 1330, then feedback is provided to the user that the word match was selected for copying into the target document as shown in box 1350. Additionally, a word or a word sequence is displayed in a unique manner to indicate that it is being offered to the user for acceptance as shown in box 1355. If the offered word(s) are accepted in decision box 1360, feedback is provided to the user that these words were selected for copying into the target document. The additional word(s) offered to the user may be one word, a phrase, all words until the end of a sentence, all words until the end of a paragraph, or some other grouping of words.

If the user decides to stop the auto-completion process in decision box 1365, then the auto-completion process is terminated. Otherwise, additional word(s) may be offered to the user for user acceptance in box 1355. Boxes 1355, 1360, and 1370 may be repeated unless the user decides to terminate the auto-completion process or no new words are offered to the user or its loops back to the first word matched.

If the offered word match is rejected by the user in decision box 1330, then the next word match is displayed with emphasis as shown in box 1340 provided alternative word matches are available as shown in box 1335. If alternative word matches are not available, then the auto-completion process is done. A user may accept or reject an offered word by selecting a designated accept or reject key, respectively.

FIGS. 14 though 17 provide an example of the auto-completion process performed on image 600 in accordance with logic flow diagram 1300.

FIG. 14 illustrates video feedback of image 600 in response to a user typing the characters "inv" and invoking the auto-completion process. Multiple word matches are highlighted on the image displayed to the user. Furthermore, the word match offered to the user for acceptance is displayed with additional emphasis. In FIG. 14, the word "invention" represents the first word match and is displayed with extra dark highlighting.

FIG. 15 illustrates video feedback of image 600 after the user has rejected the first two word matches. In FIG. 15, the highlighted word match "inversion" is shown with emphasis is offered to the user for acceptance.

FIG. 16 illustrates video feedback of image 600 once the user accepts the third word match "inversion." The rectangle surrounding the third word match indicates that it has been accepted by the user for copying into a target document. The word "look" following the accepted word match and shown with additional emphasis is now offered to the user for acceptance.

FIG. 17 illustrates video feedback of image 600 after the user has accepted a sequence of words following the accepted word match. In this example the sequence of words was accepted by selecting the accept key three additional times after the word match was accepted. The rectangle surrounding the phrase "inversion took place during" indicates that these words were selected for copying into a target document. Furthermore, the highlighted word "the" with emphasis is now being offered to the user for acceptance.

Figure 18:
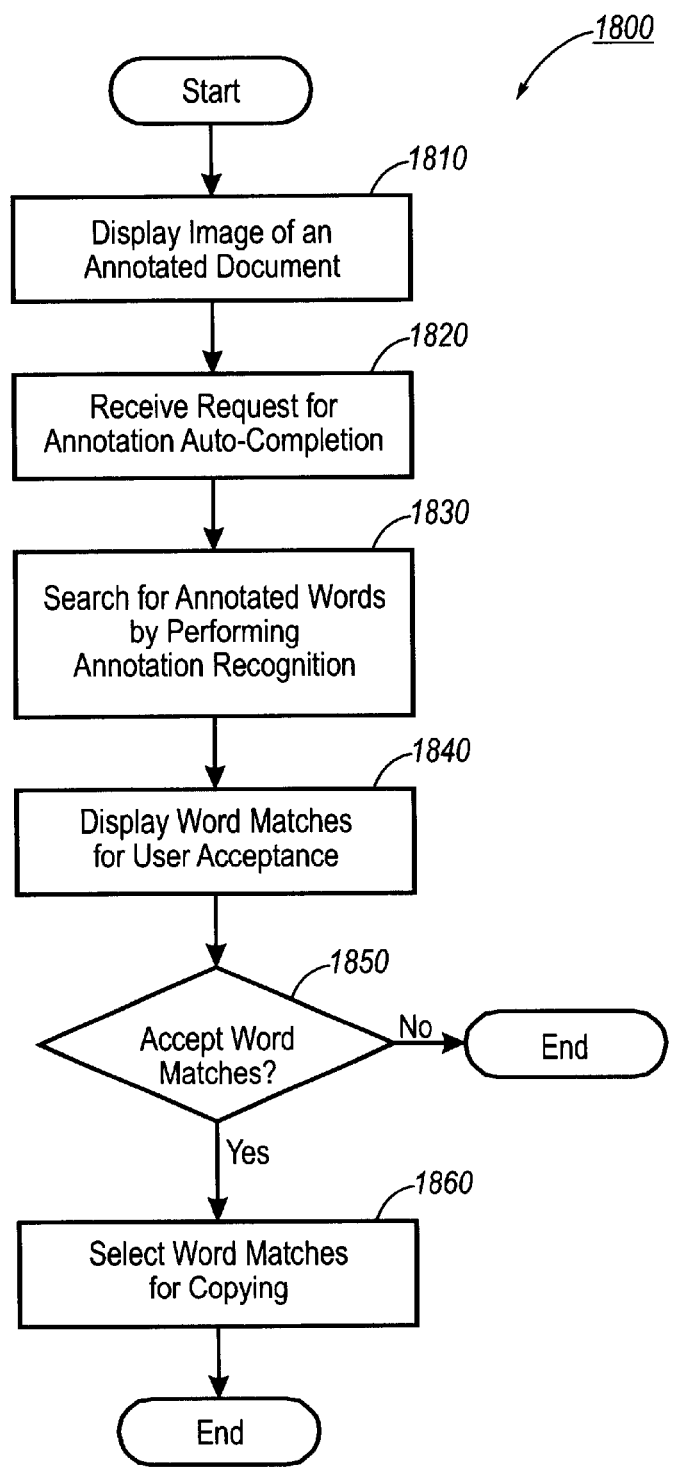
FIG. 18 illustrates a logic flow diagram for selecting one or more words using auto-completion on an image of an annotated document.

FIG. 18 illustrates a logic flow diagram 1800 for selecting one or more words using auto-completion on annotated documents. An annotated document refers to any hardcopy document containing annotations such as underlined text, circled text, or other hand written document mark-ups that can be recognized by annotation recognition.

Figure 19:
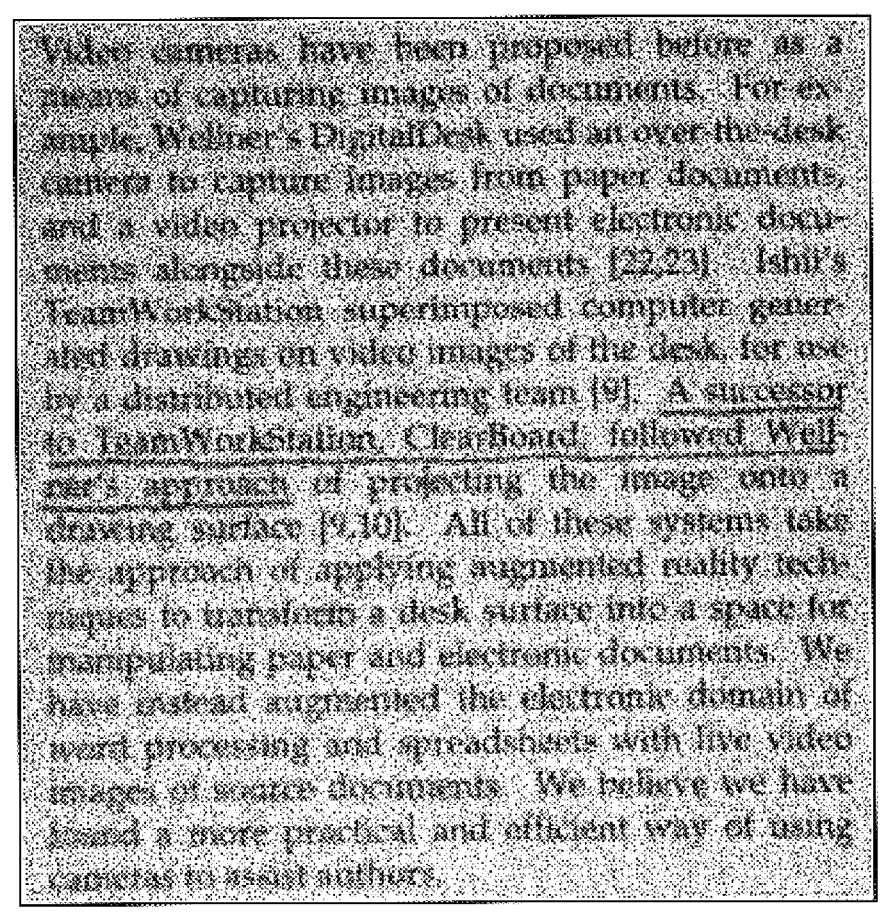

In box 1810, a stored image of an annotated document is retrieved. FIG. 19 illustrates an example of an image of an annotated document. The underlined text represents the word sequence that the user desires to copy into a target document.

In box 1820, the user invokes the auto-completion process to copy the selected text region into the target document. For one embodiment of the present invention, the "right arrow" key may be used to invoke the auto-completion process.

Once the auto-completion process is invoked, an annotation recognition process is used to identify all word(s) selected by the user as shown in box 1830. Additionally, the OCR results are then searched for word matches that correspond to the word(s) selected by the user. For one embodiment of the present invention, the annotation recognition process may be implemented by the process described in U.S. Pat. No. 5,201,011 entitled "Method and Apparatus for Image Hand Markup Detection Using Morphological Techniques" to Bloomberg et. al, which is herein incorporated by reference.

Figure 20:
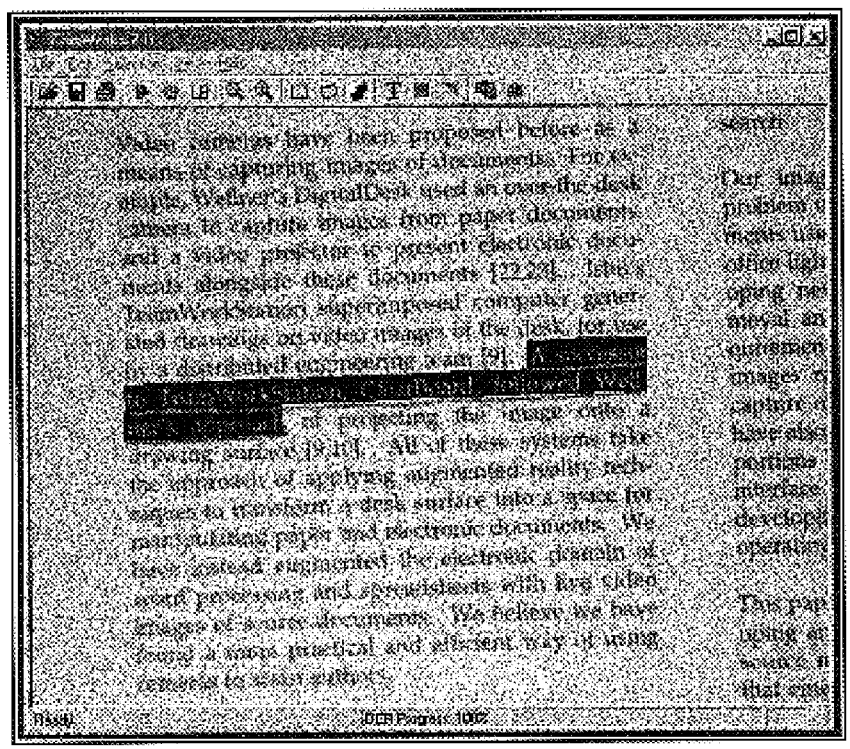
FIG. 20 illustrates video feedback of the word matches from the image of the annotated document of FIG. 19.

In box 1840, the word matches corresponding to the selected text region are displayed for user acceptance. The user may then copy the selected text region with one additional keystroke to a designated selection key. FIG. 20 illustrates an example of a selected text region being displayed to a user. The user can then decide whether to accept or reject the displayed selected text region as shown in decision box 1850. If the user accepts the text region offered, then the selected text region is copied into the target document.

For alternative embodiments, a user may identify the text region selected for copying in some other manner. For example, bracketing with hyphens may be use.

If a user types 'in..on', suggested completions might include 'initiate completion' and 'invention'.

Figure 21:
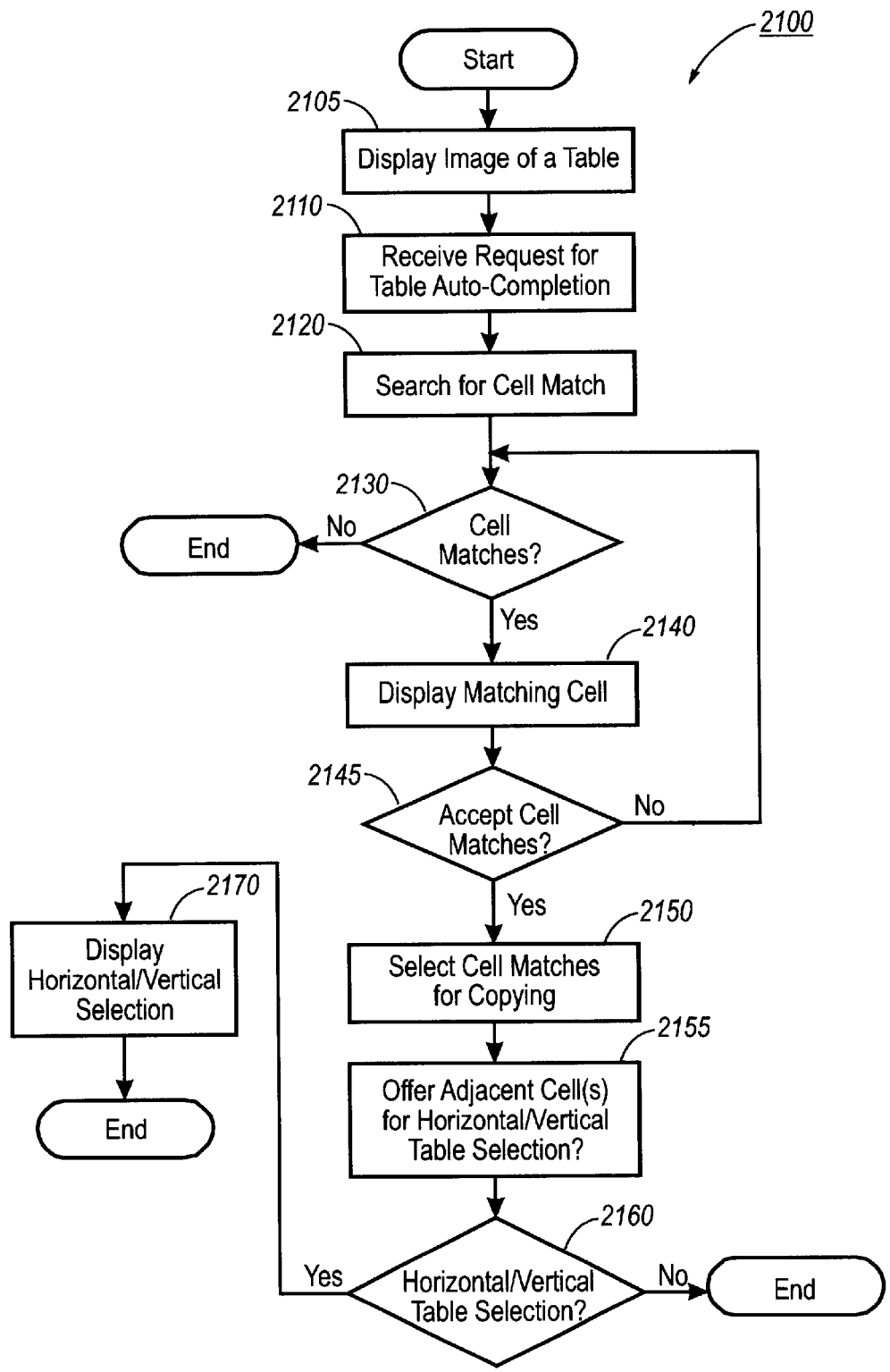
FIG. 21 illustrates a logic flow diagram for selecting text from an image of a table using auto-completion according to one embodiment of the present invention.

FIG. 21 illustrates a logic flow diagram for selecting text from a table using auto-completion according to one embodiment of the present invention.

Figure 22:
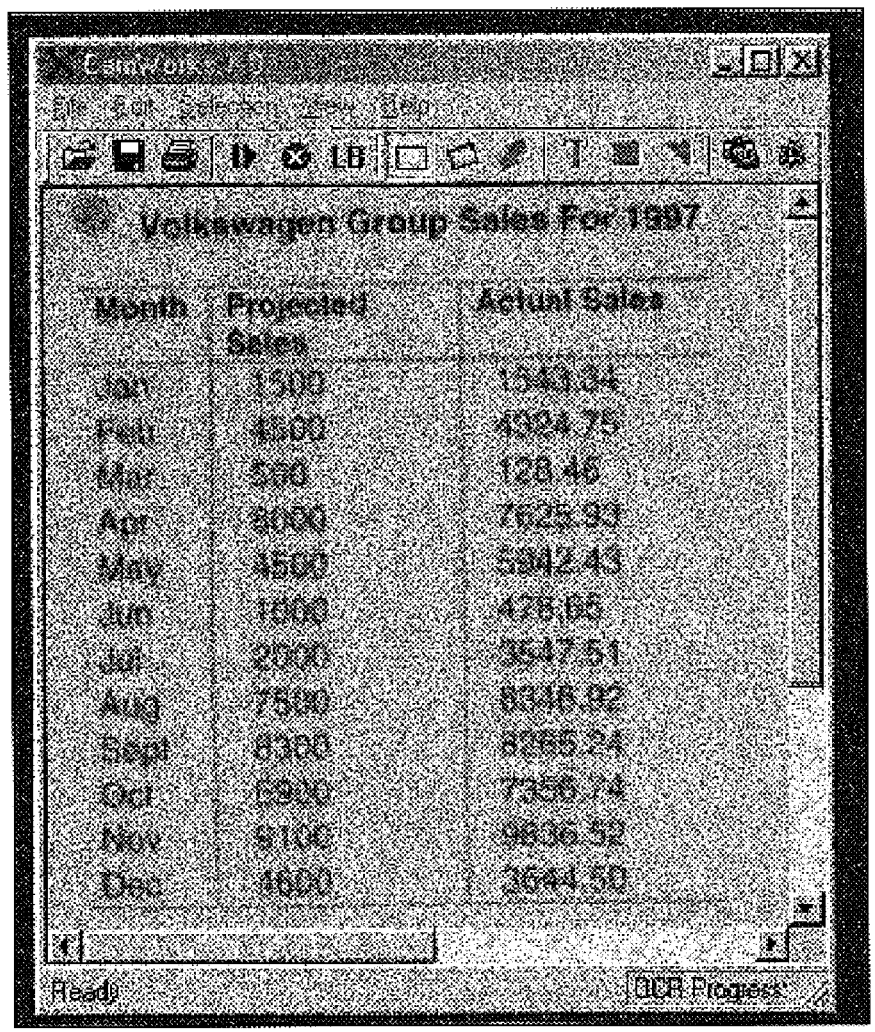
FIG. 22 illustrates a camera image of a portion of table created in a spreadsheet application.

In box 2105, a stored image of a table is retrieved. FIG. 22 illustrates an example of an image of a table having multiple rows and columns.

In box 2110, a request for table auto-completion is received. The user may type the initial characters of a word, numerical values, or some other meaningful group of alphanumeric characters. Additionally, the user may be required to invoke the table auto-completion process by selecting a request key such as the "right arrow" key.

Once the table auto-completion process is invoked, the OCR results are searched for cell matches as shown in box 2120. In other words, a determination is made as to whether the characters typed by the user matches the contexts of a cell in the table. Each cell may include one or more words, a numeric value, or other grouping of alphanumeric characters (e.g., dates).

If no cell matches are found in decision box 2130, then the table auto-completion process is ended. If a cell match is located in decision box 2130, then the cell match is displayed to the user for acceptance as shown in box 2140.

If the cell match is accepted in decision box 2145, then the cell match is selected for copying into the target document in decision box 2155, otherwise, the process returns to decision box 2130 and subsequent matches, if available, are highlighted.

Next, one or more cells adjacent to the cell match are displayed for additional vertical and/or horizontal table selection as shown in box 2155.

Figure 23:
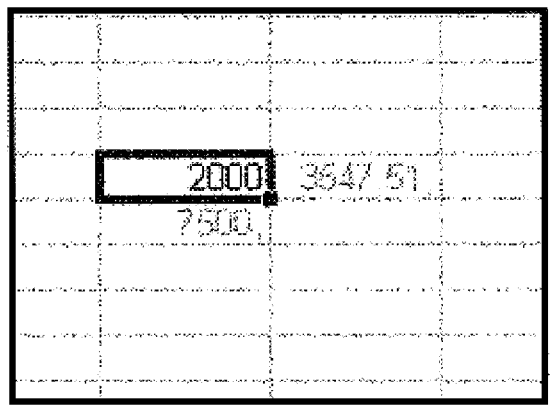
FIG. 23 illustrates the completion offered to the user in response to the user typing in "2000"

FIG. 23 illustrates an example of a cell match for the numeric value of "2000" typed by the user. In addition to offering the number value "2000" to the user, the table auto-completion offers the adjacent cells to the right and down to the user for additional horizontal and/or vertical table selections. The adjacent cell to the right has a numeric value of "3547.51" and the adjacent cell below has a numeric value of "7500".

Figure 24:
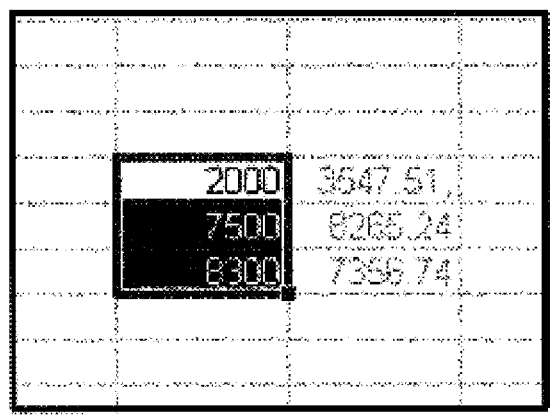
FIG. 24 illustrates acceptance of a vertical selection by the user.
Figure 25:
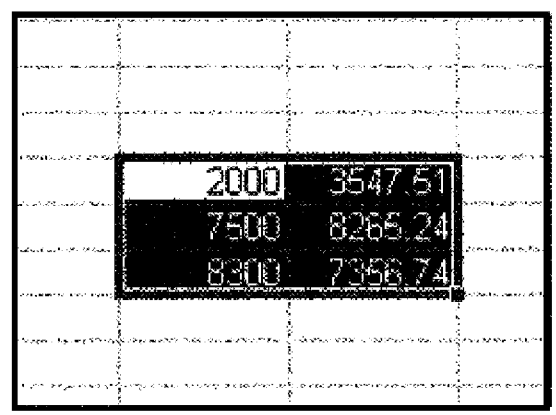
FIG. 25 illustrates acceptance of a horizontal selection by the user.

If the user makes a horizontal and/or vertical selection in decision box 2160, then additional cells are displayed and copied into the target program. FIG. 24 illustrates an example of a vertical selection made by the user. FIG. 25 illustrates an example of a vertical and horizontal selection made by the user.

Figure 26:
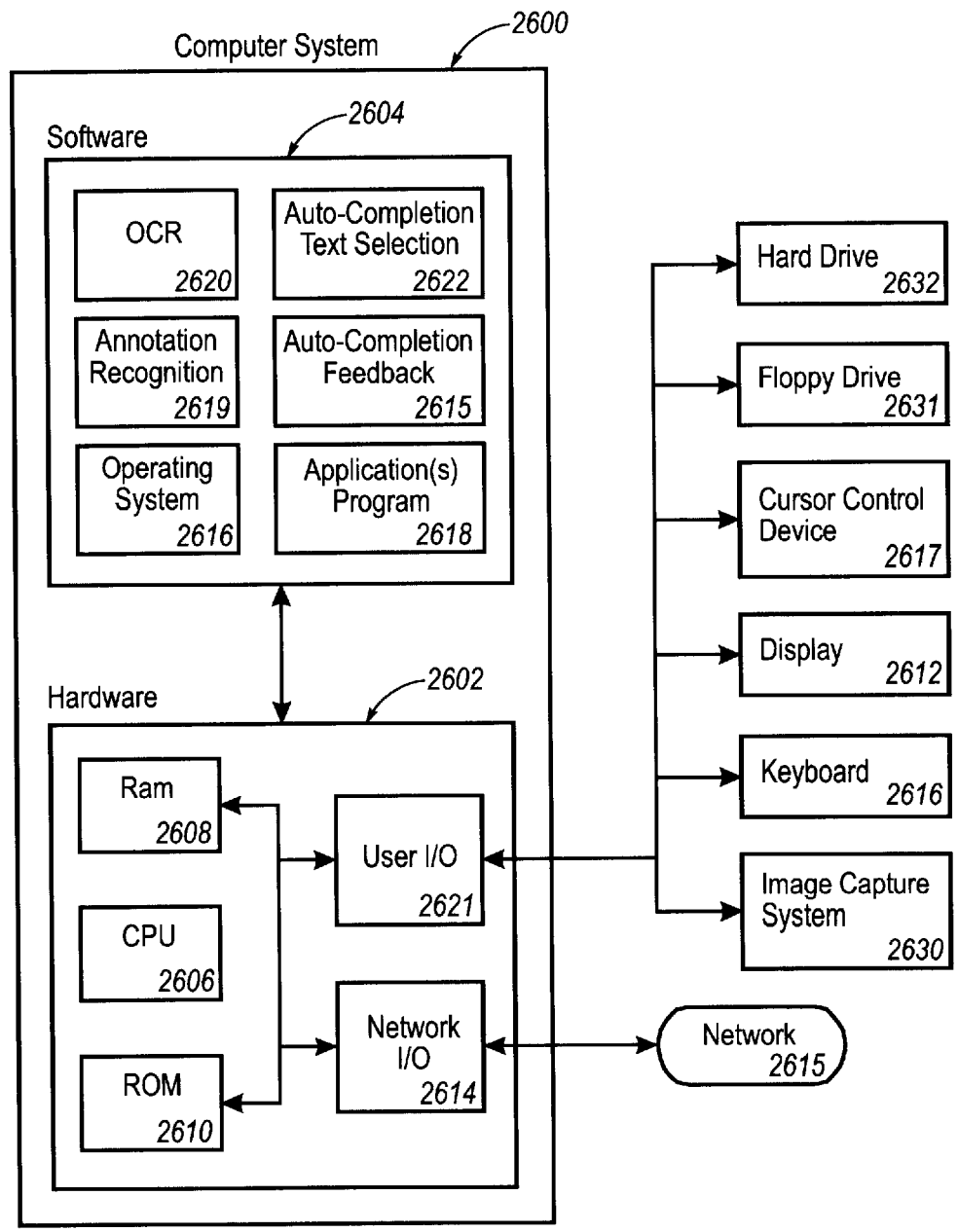
FIG. 26 illustrates a computer system for implementing an auto-completion system according to one embodiment of the present invention.

The described embodiments of the auto-completion system of the present invention may be implemented by a Computer System 2600 shown in FIG. 26. The Computer System 2600 includes Software Components 2604 and Hardware Components 2602. The Computer System can be a personal computer, workstation, etc. In a preferred embodiment, the invention is implemented in C++ on an IBM compatible PC running WINDOWS® NT.

The Hardware Components 2602 include a Processing Unit (i.e., CPU) 2606, Random Access Memory (RAM) 2608, Read Only Memory (ROM) 2610, User Input/Output ("I/O") 2621, and Network I/O 2614. The User I/O 2621 may be coupled to various input and output devices, such as a Keyboard 2616, a Cursor Control Device 2617 (e.g., pointing stick, mouse, etc.), a Display 2612, a Floppy Disk 2631 a Disk Drive 2632, an Image Capture Device 2630, etc.

RAM 2608 is used by CPU 2606 as a memory buffer to store image data (e.g., multiple bit-per-pixel image data, binary image data, rendered version of the text image data, etc.) downloaded from a file or image data acquired by Image Capture Device 2630. The image stored in RAM 2608 may be retrieved for image processing such as performing OCR. Additionally OCR results may also be stored in RAM 2608.

Display 2612 is an output device that displays image data provided by CPU 2606 or other components in Computer System 2600. In the described embodiments, Display 2612 is a raster device, however, displays such as CRTs, LCD, etc. are also suitable for the present invention.

Additionally, User I/O 2621 may be coupled to an Image Capture Device 2630 such as a camera system, scanning devices (e.g., flat-bed or hand-held scanners) or other device for capturing images of hardcopy documents.

Furthermore, User I/O 2612 may be coupled to a Floppy Disk 2631 and/or a Hard Disk Drive 2632 to store image-data. Other storage devices such as nonvolatile memory (e.g., flash memory), PC-data cards, or the like, can also be used to store data used by Computer System 2600.

The Network I/O 2614 provides a communications gateway to a Network 2615 such as a LAN, WAN, the internet, etc. The Network I/O 2614 is used to send and receive data over a Network 2615 connected to one or more computer systems or peripheral devices (such as Image Capture System 2630).

The Software Components 2604 includes an Operating System Software 2616, an OCR Module 2620, Application Program(s) 2618, an Auto-Completion Text Selection Module 2622, an Auto-Completion Feedback Module 2615, and an Annotation Recognition Module 2619. It should be noted that not all Software Components 2604 are required for all the described embodiments. The Operating System Software 2616 may represent an MS-DOS, the Macintosh OS, OS/2, WINDOWS®, WINDOWS® NT, Unix operating systems, or other known operating systems. Application Program(s) 2618 may represent one or more application programs such as word processing programs, spreadsheet programs, presentation programs, etc.

OCR Module 2620 converts an image data representation into a text image representation. For one embodiment of the present invention, OCR Module 2620 may be implemented with a TEXTBRIDGE® OCR Engine manufactured by ScanSoft, Inc. Auto-Completion Text Selection Module 2622 auto-completes one or more words in response to a users input. Auto-Completion Feedback Module 2615 provides feedback to the user of word matches found by comparing user input and OCR results.

An Annotation Recognition Module 2619 represents an algorithm for recognizing annotations made by a user on a document. The Annotation Recognition Module may be implemented by one of a variety of known detection method for recognizing hand written mark-ups on a hardcopy document such as the algorithm described in U.S. Pat. No. 5,201,011 entitled "Method and Apparatus for Image Hand Markup Detection Using Morphological Techniques."

Computer System 2600 may be implemented by any one of a plurality of configurations. For example, Processor 2606 may in alternative embodiments, be defined by a collection of microprocessors configured for multiprocessing. In yet other embodiments, the functions provided by Software Components 2604 may be distributed across multiple computing devices (such as computers and peripheral devices) acting together as a single processing unit. Furthermore, one or more aspects of Software Components 2604 may be implemented in hardware, rather than software. For other alternative embodiments, Computer System 2600 may be implemented by data processing devices other than a general purpose computer. For example, the text selection techniques of the described embodiments may be implemented in hardware and/or software in a portable device, such as a document camera.

Using the foregoing specification, the invention may be implemented as a machine (or system), process (or method), or article of manufacture by using standard programming and/or engineering techniques to produce programming software, firmware, hardware, or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of selecting a text region from at least one source document, comprising:
   (a) in response to user input of characters defining a partial word, searching optical character recognition (OCR) results representing one or more images of the at least one source document for word matches;
   (b) presenting a word match for user acceptance;
   (c) repeating (b) until the word match is accepted by a user or until all word matches have been presented; and
   (d) in response to the user accepting the word match, copying the word match into a target electronic document;
   wherein the word match copied into the target electronic document automatically completes the partial word with characters from the text region of the at least one source document.

2. The method of claim 1, further comprising, prior to (a):
   (e) producing the optical character recognition (OCR) results, the OCR results including coded text information and formatting information for each word in the image; and
   (f) storing the OCR results in a memory buffer.

3. The method of claim 1, wherein (a) further comprises:
   in response to the user typing characters of the partial word into the target electronic document, searching the OCR results representing one or more images for word matches.

4. The method of claim 1, wherein (a) further comprises:
   in response to the user typing characters of the partial word into the target electronic document and selecting a designated auto-completion request key, searching the OCR results representing one or more images for word matches.

5. The method of claim 1, wherein (a) further comprises:
   in response to the user input of the partial word,
      (i) searching the OCR results of an image representing a hardcopy document within a field of view of an image capture device;
      (ii) searching text in the target electronic document the user is creating; and
      (iii) searching the OCR results of one or more images of previously scanned hardcopy documents.

6. The method of claim 1, wherein (d) further comprises:
   in response to the user accepting the word match by typing additional information into the target electronic document, copying the word match into the target electronic document.

7. The method of claim 1, further comprising after (d):
   (e) repeating (a)–(d).

8. A method of selecting a text region from a source document, comprising:
   (a) in response to user input of a partial word, searching optical character recognition (OCR) results of an image of the source document for word matches;
   (b) displaying the image with all word matches highlighted with emphasis and one of the word matches highlighted with additional emphasis to indicate it is being offered to a user for acceptance; and (c) in response to the user accepting the offered word match, providing feedback to the user indicating that the offered word match represents a word selected for copying into a target electronic document.

9. The method of claim 8, further comprising:

(d) in response to the user not accepting the offered word match, highlighting a new word match with additional emphasis to indicate it is being offered to the user for acceptance; and (e) repeating step (d) until an offered word match is accepted or all word matches have been offered to the user.

10. The method of claim 8, wherein (c) further comprises:

(i) offering one or more words adjacent to the accepted word match to the user for acceptance; and (ii) in response to user acceptance of the one or more offered words, providing feedback to the user indicating that the one or more offered words represent one or more words selected for copying into the target electronic document.

11. A method of selecting a text region from a source document having user annotations of hand written mark-ups, comprising:

(a) retrieving an image of the annotated source document;

(b) identifying a selected text region based on the user annotations;

(c) searching optical character recognition (OCR) results of the image of the annotated document for a match of the selected text region;

(d) displaying to a user the match corresponding to the selected text region to indicate it is being offered for user acceptance;

(e) in response to user input accepting the offered match corresponding to the selected text region, copying characters defining the selected text region into a target electronic document; and (f) providing feedback to the user to indicate the selected text region was copied into the target electronic document.

12. A method of selecting a text region from a source document, the source document including a table with a plurality of cells, comprising:

(a) in response to user input of a character string, searching optical character recognition (OCR) results of an image of the table for cell matches;

(b) displaying a cell match to indicate it is being offered to for user acceptance; and (c) in response to user input accepting the offered cell match, copying the cell match into a target electronic document;

wherein the cell match copied into the target electronic document automatically completes the character string with characters from the text region of the source document.

13. The method of claim 12, further comprising:

(d) displaying one or more cells adjacent to the cell match for additional cell selection by a user;

(e) in response to additional cell selection by the user, providing feedback to the user of the additional cell selection; and (f) copying the additional cells selected by the user into the electronic document.

14. The method of claim 13, wherein (d) further comprises:

(i) displaying one or more cells adjacent to the cell match for vertical cell selection and/or horizontal cell selection.

15. The method of claim 1, wherein the characters of the partial word and the word match are one of numeric, alphabetic, and alphanumeric values.

16. The method of claim 1, further comprising (e) in response to the user requesting additional words from a phrase in the at least one source document containing the word match, copying the additional words from the phrase into the target electronic document.

17. The method of claim 1, wherein (d) further comprises presenting the word match for user acceptance by highlighting the text region from the one source document.

18. The method of claim 1, wherein the one or more images of the at least one source document is one of multiple bit-per-pixel image data, binary image data, and a rendered version of text image data.

19. The method of claim 18, further comprising:

(a1) capturing image data with an image capture device representing the at least one source document; and (a2) converting the image data representing the at least one source document into coded text using optical character recognition (OCR).

20. The method of claim 11, wherein the characters of the selected text region is one of numeric, alphabetic, and alphanumeric values.

21. The method of claim 12, wherein characters of the character string and the cell match are one of numeric, alphabetic, and alphanumeric values.

* * * * *